US011235695B2

(12) United States Patent
Carpenter

(10) Patent No.: US 11,235,695 B2
(45) Date of Patent: Feb. 1, 2022

(54) FLUID LOAD STABILISER

(71) Applicant: Bradely John Carpenter, Narangba (AU)

(72) Inventor: Bradely John Carpenter, Narangba (AU)

( * ) Notice: Subject to any disclaimer, the term of this patent is extended or adjusted under 35 U.S.C. 154(b) by 0 days.

(21) Appl. No.: 16/301,816

(22) PCT Filed: May 19, 2017

(86) PCT No.: PCT/AU2017/050470
§ 371 (c)(1),
(2) Date: Nov. 15, 2018

(87) PCT Pub. No.: WO2017/197464
PCT Pub. Date: Nov. 23, 2017

(65) Prior Publication Data
US 2019/0152377 A1 May 23, 2019

(30) Foreign Application Priority Data
May 20, 2016 (AU) .................. 2016901893

(51) Int. Cl.
*B65D 90/52* (2006.01)
*B60P 3/22* (2006.01)
(Continued)

(52) U.S. Cl.
CPC .......... *B60P 3/2235* (2013.01); *B60K 15/077* (2013.01); *B60P 3/24* (2013.01);
(Continued)

(58) Field of Classification Search
CPC ........ B60P 3/24; B60P 3/2235; B60K 15/077; B60K 2015/0344; B60K 2015/0775; B60K 2015/0777; B65D 88/126; B65D 90/52
(Continued)

(56) References Cited

U.S. PATENT DOCUMENTS 1,392,892 A * 10/1921 Imber .................... B64D 37/06
220/563
4,611,724 A 9/1986 Watkins et al.
(Continued)

FOREIGN PATENT DOCUMENTS

AU 2002302001 * 6/2004 ............ B65D 90/52
AU 2002302001 A1 6/2004
(Continued)

OTHER PUBLICATIONS

International Search Report dated Jul. 24, 2017 for corresponding International Patent Application PCT/AU2017/050470 filed on May 19, 2017.
Written Opinion of the International Searching Authority dated Jul. 24, 2017 for corresponding International Patent Application PCT/AU2017/050470 filed on May 19, 2017.

*Primary Examiner* — James N Smalley
*Assistant Examiner* — Elizabeth J Volz
(74) *Attorney, Agent, or Firm* — David D. Brush; Westman, Champlin & Koehler, P.A.

(57) ABSTRACT

A liquid tank including an internal network of cells. The cells are configured such that in use, movement of liquid between adjacent cells of the network of cells is prevented or retarded such that under conditions of liquid movement within the tank, kinetic energy transferred from the liquid to the tank wall is reduced as compared with the case where no cells are present. The tank is useful in the context of road tankers, for example, and can lessen the chance or completely prevent the vehicle from overturning on a corner due to shifting of the liquid load carried.

21 Claims, 11 Drawing Sheets

(51) Int. Cl.
  *B60P 3/24*       (2006.01)
  *B65D 88/12*      (2006.01)
  *B60K 15/077*     (2006.01)
  *B60K 15/03*      (2006.01)

(52) U.S. Cl.
  CPC ........... *B65D 88/126* (2013.01); *B65D 90/52* (2013.01); *B60K 2015/0344* (2013.01); *B60K 2015/0775* (2013.01); *B60K 2015/0777* (2013.01)

(58) Field of Classification Search
  USPC .............. 220/563, 564, 4.12, 501, 562, 507, 220/560.07, 567.2
  See application file for complete search history.

(56) References Cited

U.S. PATENT DOCUMENTS

| | | | |
|---|---|---|---|
| 5,779,092 A * | 7/1998 | Hehn | B60P 3/224 137/574 |
| 10,145,508 B2 * | 12/2018 | Kim | F17C 3/022 |
| 2002/0179611 A1 | 12/2002 | Hagenbuch | |

FOREIGN PATENT DOCUMENTS

| | | | | |
|---|---|---|---|---|
| DE | 202008000331 U1 | 4/2008 | | |
| EP | 2062834 | * 5/2009 | ............ | B65D 88/36 |
| EP | 2062834 A1 | 5/2009 | | |
| GB | 1129681 A | 10/1968 | | |
| GB | 2515558 A | 12/2014 | | |
| JP | H04260827 A | 9/1992 | | |

* cited by examiner

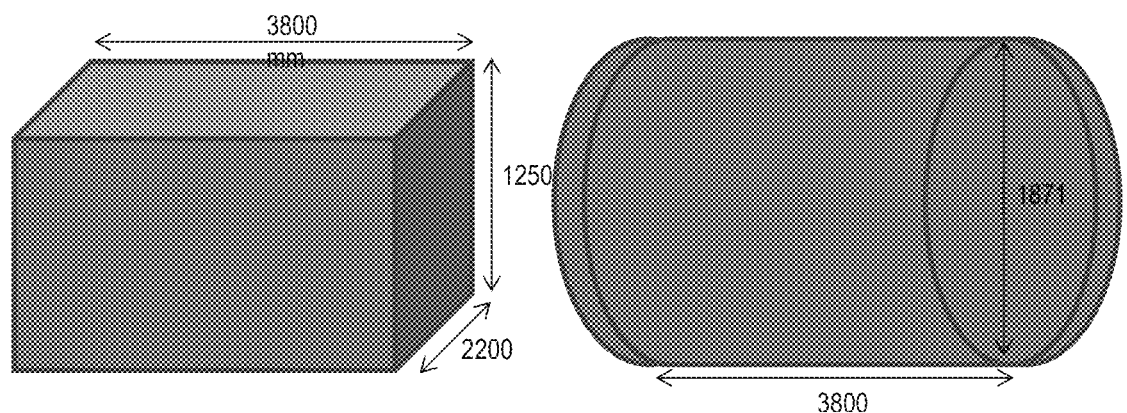
FIG. 9A
FIG. 9B
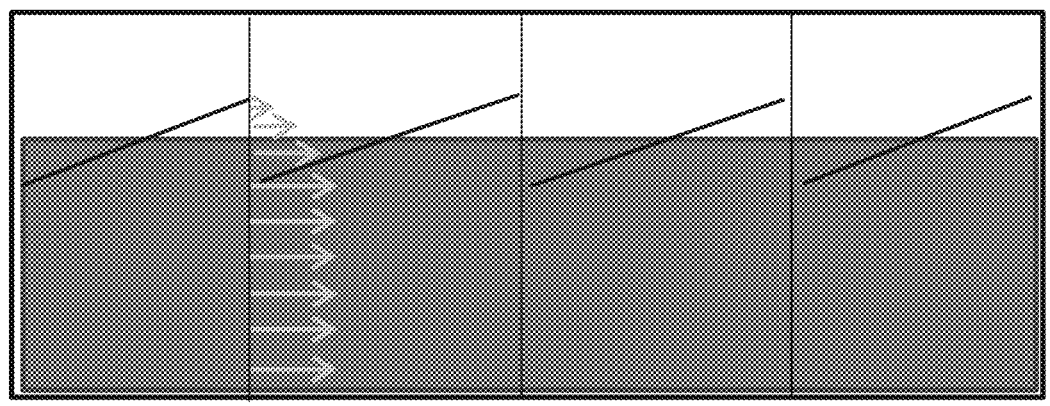
FIG. 10

FLUID LOAD STABILISER

The present application is a Section 371 National Stage Application of International Application No. PCT/AU2017/050470, filed May 19, 2017, which is incorporated by reference in its entirety and published as WO 2017/197464 A1 on Nov. 23, 2017, in English.

FIELD OF THE INVENTION

The present invention relates to improvements in tanks used for the transport of bulk liquids such as water, milk, fuel, chemicals and the like. In particular, but not exclusively, the invention relates to means for inhibiting the shifting of liquid loads in tanks hauled by vehicles on public roads.

BACKGROUND TO THE INVENTION

The transport of bulk liquids is an essential part of all modern economies. While a large proportion of bulk liquids are carried by rail, there remains considerable need to use public roads for such transport.

Typically a road vehicle is fitted with a tank on a rear tray, or alternatively the tank may be hauled behind the vehicle by an articulated linkage. As an example of the former, a tank may be fitted to a standard tray truck for the transport of water. For the latter, a prime mover may haul a milk tanker.

A problem in bulk liquid transport is presented by the inevitable movement of the liquid within the tank during transport. For example, the liquid within a tanker taking a corner or a bend on a road leads to a shifting of the load resulting in an increased danger of the tanker overturning due to the forces exerted along one side of the internal surface of the tank. Many deaths and serious injuries have been caused on public roads where a tanker has overturned onto an adjacent vehicle, or otherwise lost stability.

The danger of overturning is increased where the tank is not completely full given the ability of the liquid to move more freely within the tank. Thus, for applications where it is common for a partially filled tank to be transported the danger of overturning is increased. As an example, a water tanker that dispenses multiple fractional deliveries over the course of a single run will be only partially full for the majority of the journey. Similarly, a milk tanker picking up a batch of milk from multiple farms in a single run will also be operating at partial capacity for most of the time on the road. As another example, a tanker carrying gas (petrol) is not typically filled to capacity given the need to allow for expansion of the liquid due to the potential for temperatures changes during transport.

The prior art has attempted to address the problem of overturning by limiting the height of tanks, which in turn lowers the centre of gravity of the load. Bulk liquid transport tanks typically have a circular or ovoid cross-sectional geometry so as to maintain a relatively low centre of gravity. Such geometry also acts to resist deformation against the outward forces exerted by the inevitable shifting of a liquid load within the tank. As will be readily understood, tanks having circular or ovoid cross-sectional geometry are relatively space inefficient, as compared with a tanks having a square or rectangular cross-section. This space inefficiency increases the cost of transporting a unit volume of a bulk liquid.

Other approaches of the prior art include the incorporation of electronic speed controllers and traction control means on trucks which carry liquid loads. These contrivances are not completely effective, and cannot overcome the loss of stability when a large volume of liquid surges within a tank.

It is an aspect of the present invention to overcome or ameliorate a problem of the prior art by providing a tanks which has a reduced propensity for overturning when carrying a liquid load. It is a further aspect to provide an alternative to prior art solutions, or attempted solutions to the problem of a tank overturning.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

In a first aspect, but not necessarily the broadest aspect, the present invention provides a liquid tank comprising an internal network of cells (which may be interconnected cells whereby some movements of liquid between cells is permitted), the cells configured such that in use, movement of liquid between adjacent cells of the network of cells is prevented or retarded such that under conditions of liquid movement within the tank, kinetic energy transferred from the liquid to the tank wall is reduced as compared with the case where no cells are present.

In one embodiment, the liquid tank has a lateral wall against which a liquid within the tank bears under a cornering force exerted on the tank, the cornering force having a vector directed toward the lateral wall, and in which case the cells are formed by one or more walls configured to prevent or inhibit movement of the liquid toward the lateral wall.

In one embodiment, the liquid tank is elongate, and the cells are formed by one or more walls extending substantially the length of the tank, the one or more walls being substantially parallel to the longitudinal axis of the tank.

In one embodiment, the liquid tank is elongate, and the cells are formed by at least about 2, 3, 4, 5, 6, 7, 8, 9, 10, 11, or 12 walls extending substantially the length of the tank, the at least about 2, 3, 4, 5, 6, 7, 8, 9, 10, 11, or 12 walls being substantially parallel to the longitudinal axis of the tank.

In one embodiment, a first cell and second cell share a common wall, and the common wall comprises liquid flow control means configured such that under conditions of liquid movement the flow of liquid between the cells is substantially retarded.

In one embodiment, the walls of a first cell and second cell abut, and the abutting walls comprise liquid flow control means configured such that under conditions of liquid movement the flow of liquid between the cells is substantially retarded.

In one embodiment, the liquid flow control means is configured such that under conditions of tank filling and/or tank emptying liquid flows substantially uninhibited between the first and second cells.

In one embodiment, the liquid flow control means is or comprises one or more apertures.

In one embodiment, the majority of cells of the network of cells share a wall with another cell, or have a wall abutting another cell.

In one embodiment, the cells of the network of cells is formed from two or more layers of cells, the two or more layers of cells formed by one or more horizontal dividers.

In one embodiment, the walls of the cells of the network of cells are substantially planar.

In one embodiment, each cell of the network of cells is substantially immovable with respect to the remaining cells.

In one embodiment, the network of cells is configured so as to be substantially rigid.

In one embodiment, the network of cells is configured so as to be removable from the tank as a unitary item from the tank.

In one embodiment, the tank is openable so as to allow removal of the network of cells.

In one embodiment, the tank is openable from the top.

In one embodiment, a resiliently deformable material is disposed between the edge of network of cells and the tank wall.

In one embodiment, wherein the tank has at least two side walls which are substantially planar.

In one embodiment, the tank is substantially rectangular prismatic, or has a cross-sectional profile which is circular or ovoid.

In one embodiment, the tank has a capacity of greater than about 1000, 2000, 3000, 4000, 5000, 10000, 15000, 20000, 30000, 40000, or 50000 litres.

In one embodiment, the tank has a capacity of less than about 50000, 40000, 30000, 20000, 15000, 10000, 5000, 4000, 3000, 2000 or 1000 litres.

In one embodiment, the tank is configured so as to be fixed to, or hauled by, a vehicle.

In one embodiment, all materials in contact with a liquid load is a food grade material.

In a second aspect, the present invention provides a kit of parts comprising: a liquid tank, and a network of cells configured such that in use, movement of liquid between adjacent cells of the network of cells is prevented or retarded such that under conditions of liquid movement within the tank, kinetic energy transferred from the liquid to the tank wall is reduced as compared with the case where no cells are present.

In one embodiment of the kit, the network of cells is as described herein.

In one embodiment of the kit, the walls of the liquid tank are substantially in unassembled form, the component parts being substantially planar.

In one embodiment of the kit, the majority of the components of the kit are substantially planar.

In a third aspect, the present invention provides a method for manufacturing a liquid tank, the method comprising the steps of: providing a liquid tank, providing a network of cells configured such that in use, movement of liquid between adjacent cells of the network of cells is prevented or retarded such that under conditions of liquid movement within the tank, kinetic energy transferred from the liquid to the tank wall is reduced as compared with the case where no cells are present, and disposing the network of cells in the tank.

In one embodiment of the method of the third aspect, the network of cells is as described herein.

In a fourth aspect, the invention provides a method for cleaning a liquid tank as described herein, the method comprising the steps of: removing the network of interconnecting cells from the liquid tank, or otherwise exposing the cells, and cleaning the network of cells and the interior surface of the tank.

In one embodiment of the method of the fourth aspect, the method comprises the step of disposing the cleaned network of cells into the tank.

In a fifth aspect, the present invention provides a liquid transport apparatus comprising wheels and any one of the liquid tanks as described herein.

BRIEF DESCRIPTION OF THE DRAWINGS

FIG. 9 is a diagram showing pressure vessel geometries tested for wall thickness effects.

FIG. 10 is a diagram of a tank having three longitudinal vertical walls disposed therein.

DETAILED DESCRIPTION OF THE INVENTION

After considering this description it will be apparent to one skilled in the art how the invention is implemented in various alternative embodiments and alternative applications. However, although various embodiments of the present invention will be described herein, it is understood that these embodiments are presented by way of example only, and not limitation. As such, this description of various alternative embodiments should not be construed to limit the scope or breadth of the present invention. Furthermore, statements of advantages or other aspects apply to specific exemplary embodiments, and not necessarily to all embodiments covered by the claims.

Throughout the description and the claims of this specification the word "comprise" and variations of the word, such as "comprising" and "comprises" is not intended to exclude other additives, components, integers or steps.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may.

The present invention is predicated at least in part of Applicant's finding that overturning of bulk liquid transport tanks can be inhibited or completely prevented by the incorporation of a network of cells within the tank. Accordingly, in a first aspect the present invention provides a liquid tank comprising an internal network of cells, the cells configured such that in use, movement of liquid between adjacent cells of the network of cells is prevented or retarded such that under conditions of liquid movement within the tank, kinetic energy transferred from the liquid to the tank wall is reduced as compared with the case where no cells are present.

The function of the cells is to essentially divide the bulk volume of liquid in the tank into a series of sub volumes. Without wishing to be limited by theory in any way, it is proposed that by preventing the bulk liquid from moving as a single body of liquid, the ability of the fluid to bear against an internal wall of the tank is decreased.

Figure 1A:
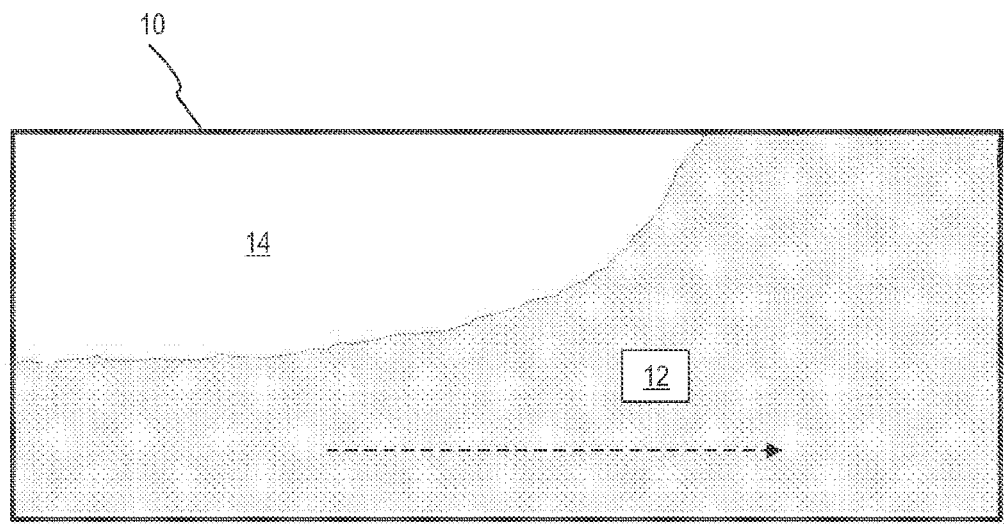
FIG. 1A shows in diagrammatic form a cross-section of a prior art tank filled to 60% capacity with a liquid load (shaded area).

Reference is made to FIG. 1A (prior art) which shows a cross-section through a prior art tank which is 60% full of a liquid. At any level below 100% capacity, there is free space in the tank to allow for the movement of the bulk liquid contained therein. The liquid shown in the FIG. 1A as would be expected in response to a lateral force (acting from the left to the right of the page) exerted by a cornering vehicle. The lateral force causes the liquid to bear against the right-hand side of the tank (as drawn), this increasing the propensity for the tank to overturn, as shown in FIG. 10. As will be clear from FIG. 10, in this scenario a proportion of the liquid has migrated upwardly to contact the ceiling of the tank, this increasing the height of the centre of gravity of the load, leading to a further increase in the propensity for the load to overturn.

Figure 1B:
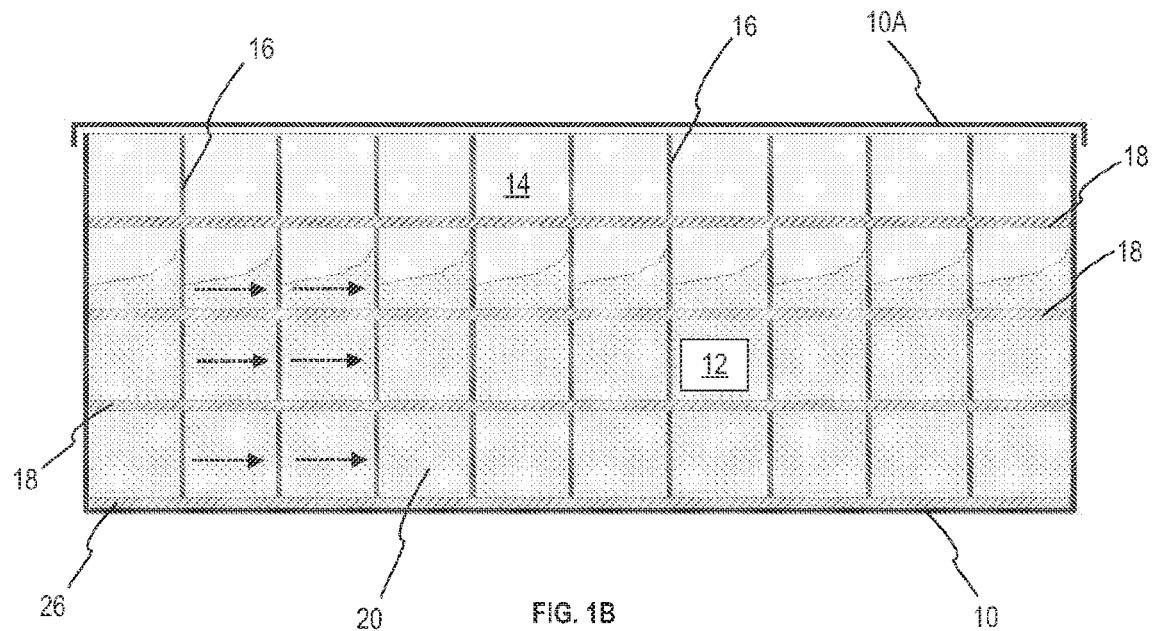
FIG. 1B shows in diagrammatic form a cross-section of a tank of the present invention filled to 60% capacity with a liquid load (shaded area), the tank incorporating a network of interconnected cells. The tank also comprises a removable lid.
Figure 1C:
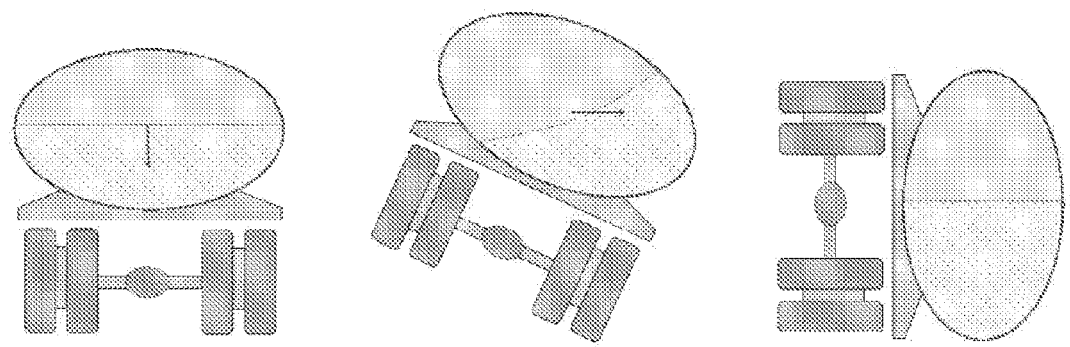
FIG. 1C shows in diagrammatic form a cross-section of a prior art tanker trailer that is partially filled. The series of diagrams from left to right show the result of a cornering force acting to push liquid against the right hand side lateral wall so as to cause the trailer to overturn.
Figure 1D:
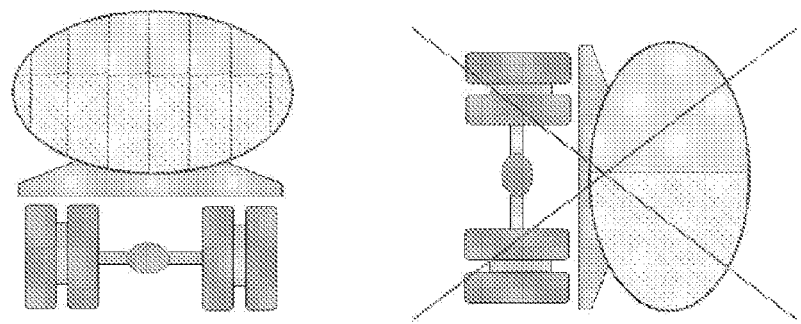
FIG. 1D shows in diagrammatic form a cross-section of a tanker trailer comprising an elongate liquid tank of the present invention that is partially filled. The liquid tank comprises a series of 7 vertical walls parallel to each other, and also parallel to the longitudinal axis of the liquid tank. Upon application of a cornering force the trailer does not overturn.

Turning to comparative FIG. 1B, there is shown an identical tank as that for FIG. 1A (and also at 60% capacity) having the same lateral cornering force exerted thereon. The tank of FIG. 1B is fitted with a network of cells of the present invention, of the type shown in later drawings herein. It will be noted that the liquid contained within the two lower rows of cells remains essentially stationary, this due to the general inability of a fluid to compress. Accordingly, it is only the fluid in the cells of the second row which is capable of migrating toward the wall of the tank. Moreover, it will be noted that no fluid whatsoever has migrated upwardly so as to contact the ceiling of the tank. This limitation in the bulk shifting of the liquid load due to the presence of the network of cells improves the stability of the load in response to a cornering force. As shown in FIG. 1D, the cells act to stabilise the liquid within a tanker trailer, thereby preventing overturning.

Figure 1E:
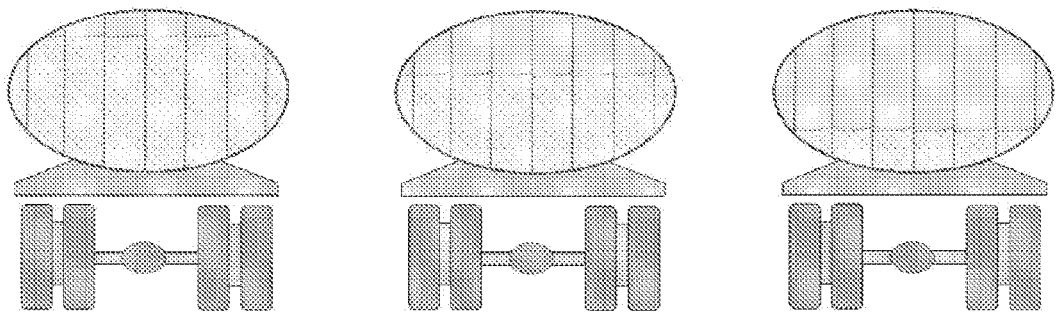
FIG. 1E shows in diagrammatic form a cross-section of a tanker trailer in which lateral load shifting can be reduced irrespective of the fill level of the tank.

Applicant has found that the amount of lateral load shifting can be reduced irrespective of the fill level of the tank, as shown in FIG. 1E. In some embodiments, the amount of lateral load shifting is decreased by at least 50%, 60%, 70%, 80%, 95% or 99% by use of the network of cells, as compared with the same tank that is devoid of the network of cells.

The comparative examples shown in FIGS. 1A and 1B are intended to be illustrative only, and not prescriptive for all fluids. As will be understood, the movement of a liquid under a lateral cornering force will depend on a range of parameters such as viscosity of the fluid, the level of fill, geometry of the cells, capacity of the cells, geometry of the tank, capacity of the tank and the like. Given the teaching of the present specification, the skilled person is enabled alter any one or more of these parameters so as to achieve at least some lowering of the propensity of a load to destabilise or overturn during cornering.

Modelling studies detailed herein infra, demonstrate that the fluid stabilisation brought about by the use of a network of cells is capable of limiting the sloshing movement of a liquid within a tank. The advantages of the invention may be seen to arise from the concept of dividing the tank volume into smaller cells, which limits the broad scale movement of liquid and restricts fluid centre of gravity raising and lateral movement during turning manoeuvres. Centre of Gravity (COG) has a direct relationship on the safety, or rollover stability of a road transport tanker. Lowering the COG reduces the distance to the tyre pivot point around which the rollover forces are applied.

The modelling studies calculate the cornering COG shift of the liquid within tanks. The calculations show a significant reduction in the outward and upward shift of the fluid's COG occurs when including longitudinal baffles in a tank. This means the baffles will improve the roll stability of tankers when cornering. The longitudinal baffles are expected to result in an even more significant resistance to rollover from transient dynamic effects when cornering or performing lane change or other evasive manoeuvres.

Each of the cells may be substantially individually formed, and brought together so as to provide a network. The cells may be connected using adhesive, ties, rivets, welding, or any other type of fastening.

Alternatively the cells may share a single wall, this generally being the more cost-effective manner of fabrication.

In a relatively basic embodiment, the network of cells may consist of only two cells. In that embodiment, a single vertical wall may extend along the central longitudinal axis of the tank so as to substantially divide the tank interior into two cells of substantially equal volume.

However fabricated, the network of cells may be interconnected, the liquid connection between cells being provided by liquid control means therebetween to allow for at least some movement of fluid between cells. The function of the liquid control means is to allow the fluid to flow from cell to cell during filling of the tank, while substantially retarding flow from cell to cell during transport of the tank. Each cell typically has at least one liquid flow control means in a wall to allow for the minor flow of liquid laterally from cell to cell, but may also have at least one liquid flow control means in a floor and/or a ceiling.

In some embodiments, the liquid control means is not a discrete feature and may be formed by a loose junction between a wall and floor of a cell. Alternatively, an entire component may be formed of a material which is incapable of retaining a liquid and may for example "weep" fluid.

In some embodiments the liquid flow control means is an aperture of any type, and may be a circular hole or a slot, or a multiple apertures such as a grating.

In other embodiments, the flow control means may be a tube of any type having an internal diameter and/or tortuous path designed to control the flow of liquid from one cell to the other.

In other embodiments, the flow control is not passive, and is configured to react to an alteration in conditions. For example, the flow control means may allow for liquid at low pressures to pass easily (such as when filling the tank), while fluid bearing with some pressure against a wall of a cell (for example, where the vehicle hauling the tank takes a sharp bend) faces a higher resistance to passage of the fluid between cells. As well recognised by the skilled artisan, valve means may be configured to provide such variable control of liquid flow.

More than one type of liquid flow control means may be used in a single cell, or across a network of cells. For example, the flow control means of the cell walls may be relatively small apertures so as to substantially retard the lateral movement of fluid, with larger apertures used in the ceiling and floor of the cell to speed the rate of filling.

As will be appreciated, the rate of flow of fluid through the liquid flow control means will, at least for some types of control means, be affected by the viscosity of the liquid contained in the tank. A more viscous liquid (such as molasses) will typically require flow control means providing a lower resistance to flow as compared with a less viscous liquid (such as milk). Where the liquid flow control means is an aperture, resistance to liquid flow may be modulated by, for example, altering the aperture size. A larger aperture would generally be indicated for use with a more viscous liquid. Alternatively, the flow control means could force the liquid to travel through a tortuous path to inhibit flow from one cell to another.

In some embodiments, a single layer of cells forms the network, with the cells extending in an elongate manner for the majority or substantially all of the distance from the floor to the ceiling of the tank. In such embodiments. However, more typically the network of cells extends in three dimensions, so as to form layers of cells. The cells of the layers may or may not be in register, however for ease of fabrication are typically in register. Two layers of cells may be demarcated by a single sheet material disposed therebetween. The sheet material forms the ceiling of the lower layer, and the floor of the upper layer.

In some embodiments, the cells are arranged in at least 2, 3, 4, 5, 6, 7, 8, 9, 10, 11, 12, 13, 14, 15, 16, 17, 18, 19 or 20 layers. In terms of construction, the layers may be provided by the use 1, 2, 3, 4, 5, 6, 7, 8, 9, 10, 11, 12, 13, 14, 15, 16, 17, 18, or 19 horizontal dividers. A higher number of cell layers is generally preferred given that the surface of the liquid in the tank will lie within a relatively shallow row of cells. Referring to FIG. 1B, this shallow layer of cells are those disposed between the two horizontal dividers marked 18. As will be seen from FIG. 1B the liquid immediately below the lower of the two horizontal dividers 18 is generally static and is prevented from migrating upwardly and participating in the lateral movement of liquid in the cells immediately above by the divider.

Thus, the lateral movement of liquid is restricted to that shallow volume of liquid with is within the cells between the two dividers 18. As the volume of liquid in the tank decreases (say, due to a delivery of proportion of the liquid), the surface of the liquid moves downwardly. Where multiple horizontal dividers provided, the lower level bulk of the liquid will remain generally static and substantially isolated (at least in kinetic energy terms) from the upper levels of the liquid.

Apart from the liquid flow control means, it is not necessary that any cell is entirely watertight. For example, a join between two components of the network of cells may not be sealed and therefore allow some leakage of liquid therethrough. However, so long as such leakage is relatively minor and is not overly deleterious to the function of the network of cells there is no strict requirement to ensure that the join is watertight.

In some embodiments, the network of cells is designed such that leakage between cells is anticipated. The cause of the leakage (e.g. deliberately loosely fitting or spaced components) may form the liquid flow control means.

In order to better resist the movement of liquid within the tank, the network of cells is preferably substantially rigid. For example the walls, floor (where present) and ceiling (where present) of the cells may be fabricated from a substantially rigid material. Furthermore, where the cells are discretely formed they may be joining into a network by substantially rigid connecting means such that each cell of the network of cells is substantially immovable with respect to the remaining cells.

It is not necessary that the network of cells completely occupy the tank, with occupancy volumes of at least about 50%, 60%, 70%, 80% or 90% being contemplated. Similarly, it is not necessary that the network of cells extends the complete length, or the complete width, or the complete height of the tank. However, as will be appreciated the network of cells will have the greatest effect where the network of cells occupies essentially the complete volume of the tank. In some embodiments, an internal surface of the tank (such as a wall, a floor or a ceiling) forms at least part of a cell at the periphery of the network of cells.

An advantage of some embodiments of the present invention is that the network of cells is removable from the tank. This is particularly important where the tank is used to transport food material (such as milk), and the internals of the tank must be thoroughly cleansed between loads. Accordingly, the tank may be devoid of any permanent means of attaching the cells to an internal surface of the tank, and may be devoid of a weld at the junction between an internal face of the tank and the network of cells.

As will be appreciated, lateral forces acting on the liquid load during concerning are transferred to the network of cells. In turn, the peripheral regions of the network of cells will transfer those forces to an interior face of the tank. In some embodiments, these forces are at least partially absorbed by the present of a resiliently deformable material disposed between the edge of network of cells and the tank wall. This material has the effect of limiting the transfer of forces to the tank wall and/or ceiling, and also limiting wear of the tank interior against direct contact with the edge of the network of cells.

It is generally preferred that the tank, the network of cells, and the resiliently deformable material are configured such that free movement of the network of cells within the tank is prevented. Thus, irrespective of the forces transferred from the liquid the network of cells remained connected at least to the lateral walls of the tanks by way of the resilient deformable material.

The resiliently deformable material may be permanently attached to either the network of cells or the interior surface of the tank. Alternatively, it is attached to neither and is merely disposed between the edge of the network of cells and the tank interior wall.

However configured, it is preferable that the components of the tank allow for easy removal of the network of cells to allow for thorough cleansing of both the tank interior and the cells. This feature is particularly applicable to tanks used for the transport of liquids for human consumption such as milk, beverages, drinking water and the like. For such application, prior art tanks are deliberately devoid of any internal structures given the difficulties surrounding cleaning. For example, the interior of a milk transport tank is devoid of any structure that may otherwise be useful to prevent the bulk movement of liquid within the tank. While the lack of any internal structure dramatically simplifies cleaning, it necessitates configuration of the tank to have a low centre of gravity so as to limit the opportunity for overturning due to cornering forces during transport. Accordingly, prior art milk tanks are typically ovoid in cross-section to lower the centre of gravity albeit with an attendant reduction in capacity. The use of the network of cells as disclosed herein, along with the ability to open the tank (as further discussed infra) allow for the design of tanks having lesser regard for the height of the centre of gravity when fully or partially loaded.

In some embodiments, and particularly where the network of cells is comprised of layers or cells, the network is configured so as to at least be partially disassembled thereby allowing for more complete cleansing. Such configuration may involve the use of reversible fasteners, snap fittings and the like between various components (such as wall, floor or ceiling) of the cells in the network.

In order to access, and optionally remove the network of cells the tank may openable. Preferably the tank is openable so as to allow the removal of the network of cells as a unitary structure. While the tank may be openable from any face (wall, floor, or ceiling of the tank), it is preferably openable from the top. In such an embodiment the tank may comprise a lid which forms or extends from the tank ceiling. Typically, the lid is openable so as expose an aperture of sufficient size so as to allow the intact network of cells to pass therethrough. By that arrangement, the network of cells may be removed upwardly and through the opening and thoroughly cleansed outside the tank.

Where a lid (or other similar contrivance) is provided on the tank, the lid and underlying aperture are typically configured so as to form a watertight seal. For example, the lid and aperture will be generally similarly dimensioned, albeit with the lid extending beyond the edges of the aperture. One or more seals may be disposed between the lid and a tank surface, the seals being optionally compressible upon application of the lid. The lid may further comprise hinge means, lifting means (such as a hook, eye or similar), or securing means (such as a latch, lock or similar).

Embodiments of the tank configured such that the internal network of cells form a permanent (non-removable) feature are included within the ambit of the present invention. In such embodiments, the cells may be disposed within the tank during tank construction, or the tank walls are fabricated around the network of cells. In other means of construction, the network of cells may be inserted into the tank before a final wall or end panel is fixed in place.

As discussed supra, the incorporation of a properly cleanable network of cells into a tank allows for the design of tanks (and particularly liquid food tanks) having a higher than usual centre of gravity. Thus, the present tanks are not constrained to the common ovoid or circular cross-sectional profiles which are inherently compromised in terms of space efficiency. Accordingly, in some embodiments the present tanks is more space efficient than a tank of ovoid or circular cross-section. For a given base area and height, the optimal configuration for a tank of the present invention is substantially rectangular prismatic.

While advantages in space efficiency may be provided where the tank is rectangular prismatic, the present invention is of course applicable to tanks of other geometries such a cylindrical tanks and tanks having an ovoid cross-section as non-limiting examples. Even tanks having irregular or mixed geometries may benefit from the ability of an internal network of cells to limit liquid movement therein.

The present tank and associated network of cells may be fabricated from any material deemed suitable by the skilled person. As will be appreciated from the disclosure herein, particular advantages are gained for tanks used in the transport liquid food material. Accordingly, in some embodiments, the tank is configured to comply with a relevant public health rule, act, regulation, standard, guideline, code or similar instrument. For example, the tank may comply with the provisions of the United States Sanitary Food Transportation Act of 1990, 49 USC 5701 et. Seq, or similar instrument in another jurisdiction. In that regard, all internal surfaces of the tank (wall, floor, and ceiling) and the network of cells may be fabricated from a food grade material. Various instruments define food grade materials, such as the European Union Regulation No. 1935/2004. Typically, stainless steel will be used for the tank shell at least (and possibly also for the network of cells), with food grade plastics being useful in the construction of the network of cells.

In the context of a food transport tank, the tank may comprise external signage designating same (optionally in a form as required by a relevant public health rule, act, regulation, standard, guideline, code or similar instrument) refrigeration means and/or thermal insulation means.

In one embodiment, the tank is configured so as to be transportable. Such configuration may include the use of a rigid tray upon which the tank is fixed, the tray in turn having an axle and wheels. Preferably, in such configuration there is provided a trailer which is registrable under a relevant traffic rule, act, regulation, standard, guideline, code or similar instrument to be used on a public road. Optionally, the trailer has affixed thereon registration details.

In another aspect the present invention provides a kit of parts including a liquid tank and a network of cells as described herein. The kit may be used so as to fabricate a tank of the present invention form a prior art tank by inserting the network of cells into the tank, and optionally modifying the prior art tank so as to provide an aperture of sufficient dimension so as to allow passage of the network of cells therethrough. A prior art tank may be further modified to include a lid and seals as required. Alternatively, the tank may be purpose built de novo so as to include any of the features of the present tank.

In one embodiment, the majority, or substantially all of the major components of the kit are substantially planar. This allows for configuration of the kit as a "flat pack" kit, which is easily and cost-efficiently transportable. Thus, it will be appreciated that the provision of a substantially rectangular prismatic tank and a network of cells formed from planar components (the prismatic shape being allowable by the higher than usual centre of gravity, which in turn is allowable by the network of cells).

A rectangular prismatic tank has planar walls, floor and ceiling and in disassembled form is transportable within the bounds of a relatively small volume. Assembly of planar flat pack components is a relatively simple task which may comprise the use of fasteners and sealants to form a watertight shell. The components of the network of cells may be in substantially planar form (or at least a zig-zag nestable form as shown in the preferred embodiments) can be assembled using fasteners, rivets, ties, adhesives or other means deemed suitable by the skilled person before being placed into the tank.

Kits comprising non-planar components such as the curved walls of a tank are not excluded from the present invention. For example, segments of a curved tank wall may have the same or similar profile and are therefore stackable in a space-efficient manner.

A novel method of cleaning the interior of a tank is also made possible by the present invention. Prior art means are typically of the "clean-in-place" regime whereby the tanks is flushed with a cleaning solution and then drained. The tank remains substantially closed throughout the cleaning process except for the points of entry and exist of the cleaning solution. The present cleaning process requires the network of cells to be exposed (and optionally removed from the tank) by opening of the tank (optionally by an upper lid) and then exposing the tank and network of cells to a cleaning solution.

In some embodiments, the network of cells may not be removable from the tank interior, and in which case clean-in-place solutions may be introduced and drained via filling and drainage ports on the tank.

Particularly where the tank is used for the transport of a liquid food, routine effective cleaning is of paramount importance. Taking milk as an example of a liquid food bacteria can build up in a tank and contaminate milk being transported. The bacteria affect milk quality, and reduces the shelf life. Cleaning aims to maintain milk quality by the remove of substantially all milk residues from the tank interior and destroying any resident bacteria. Milk is a difficult material to clean from surfaces because it comprises many different components (protein, fats, salts, sugars etc.), each requiring different temperatures and chemical environments to aid removal. Typically, an effective cleaning regime includes four key elements: thermal energy (which comes from hot water), time taken for effective cleaning (this is often dependent on the type of cleaning routine), kinetic energy from water turbulence (which is related to water volume and flow rate, and chemical energy from acid (pH about 2.5-3.0) and alkali (about pH 11.5-12.5) and detergents.

Typically a final water rinse is used to remove traces of cleaning chemicals, before the network of cells is replaced in the tank ready to receive the next load of milk.

The present invention will now be more fully described by reference to the following non-limiting preferred embodiment.

Preferred Embodiments of the Invention

This embodiment is directed to a rectangular prismatic liquid food transport tank having a multilayered network of interconnected cells disposed therein. Reference is made to FIG. 1A which shows a prior art tank 10 having a liquid load 12 (at around 60% capacity) and free space 14. The effect of a cornering force (as indicated by the dashed arrow) on the liquid load 12, as would be occasioned by a vehicle carrying the tank 10 taking a hard bend in the road. The dashed arrow shows the lateral vector component of the cornering force. It will be noted that given the space 14 in the tank, the liquid load 12 is permitted to freely shift in the direction of the lateral vector thereby creating a weight imbalance in the tank. Upon cornering, the bulk of the liquid shifts to the right side of the tank (as drawn) thereby increasing the propensity of the tank to overturn.

Direct comparison is made with FIG. 1B, being a tank of the present invention having a series cuboid interconnected cells, with multiple cells extending for the length and width of the tank. Four layers of cells are tacked in register for the full height of the tank. The cells are formed by a series of vertical walls (two of which are marked 16), and three horizontal dividers 18 which intersect therewith. One of the cells is marked 20. Base blocks (one of which is marked 26) are disposed between the lower surfaces of the network of cells and the floor of the tank so as to prevent rubbing of cells against the tank floor.

Fluid flow control means (not marked) are disposed in the vertical walls 16 and horizontal dividers 18 allow for the highly restricted flow of liquid between cells, such that each cell is in fluid connection with all other cells. Upon application of the same cornering force as shown for FIG. 1A, there is no bulk movement of liquid to the right of the tank and according significant less destabilization of the tank during cornering. It will be noted that under the lateral cornering force the liquid load is essentially divided into a plurality of smaller, substantially isolated loads. Each substantially isolated load is subject to only a portion of the lateral cornering force (as shown by the relatively short dashed arrows). The lower two layers of cells are filled to capacity, and because of the resistance of a liquid to being compressed, there is no shifting of the liquid (either laterally or vertically) in these cells. In the third row of cells, each cell is only partially filled and there is therefore some shifting of the liquid in each cell. However, the bulk of the liquid is prevented form shifting, thereby resulting in an overall more stable load compared with that shown in FIG. 1A.

The tank of the invention shown in FIG. 1A incorporates a lid 10A, which forms the ceiling of the tank.

Figure 2A:
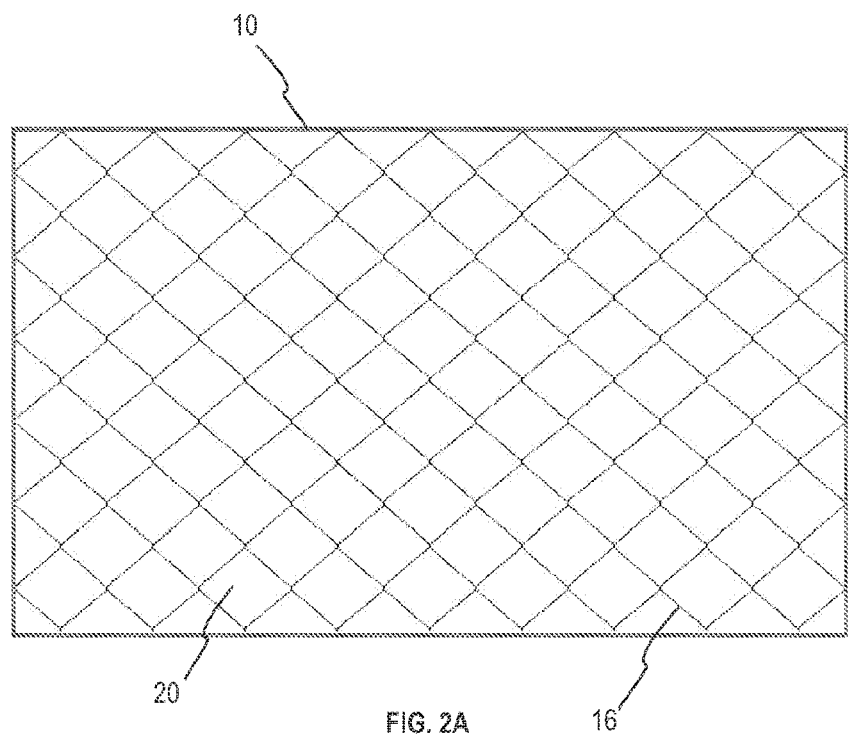
FIG. 2A is a plan view of a tank of the present invention, comprising a network of substantially cuboid cells.

Turning now to FIG. 2A there is shown a plan view of a tank of the present invention, showing the plurality of cuboid cells 20 occupying essentially the full width and length of the tank 10. The triangular cells disposed about the periphery of the tank, may function as cells given that the tank wall may form a cell wall if there is sufficiently close abutment.

Figure 2B:
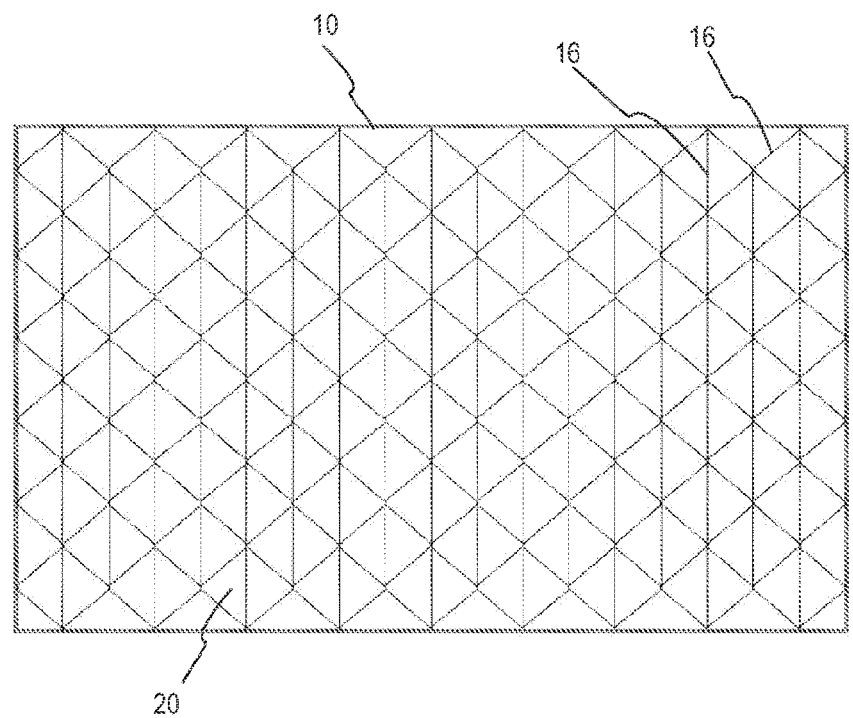
FIG. 2B is a plan view of a tank of the present invention, comprising a network of substantially triangular cells.

A variation on the embodiment of FIG. 2A is shown in FIG. 2B whereby each cuboid cell is essentially bisected to form two smaller triangular cells. As will be appreciated, it is generally desirable for the tank to have a greater number of smaller cells, so as to better inhibit movement of the liquid load due to a cornering force.

Figure 3A:
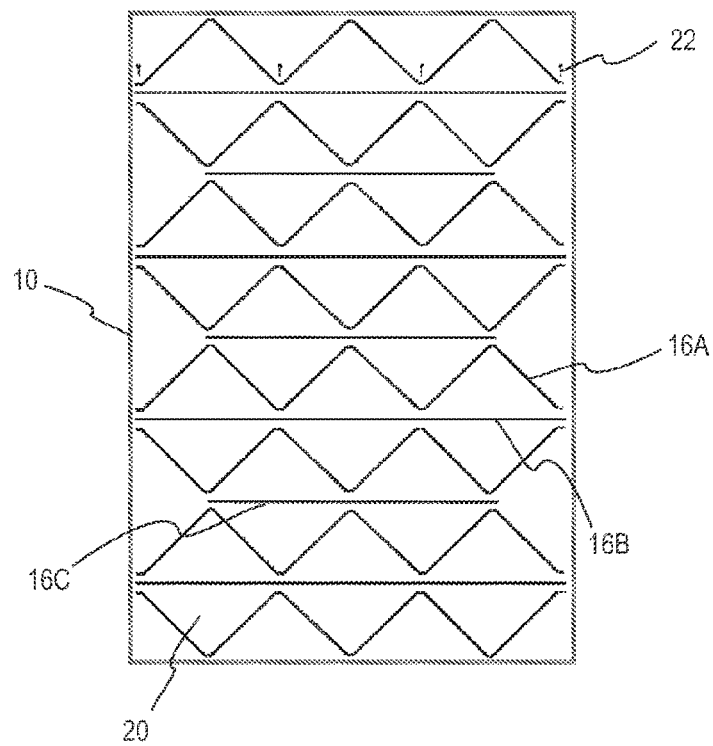
FIG. 3A is an exploded plan view of a tank having triangular cells (similar to the embodiment of FIG. 2B) to show more clearly the arrangement of the walls.
Figure 3B:
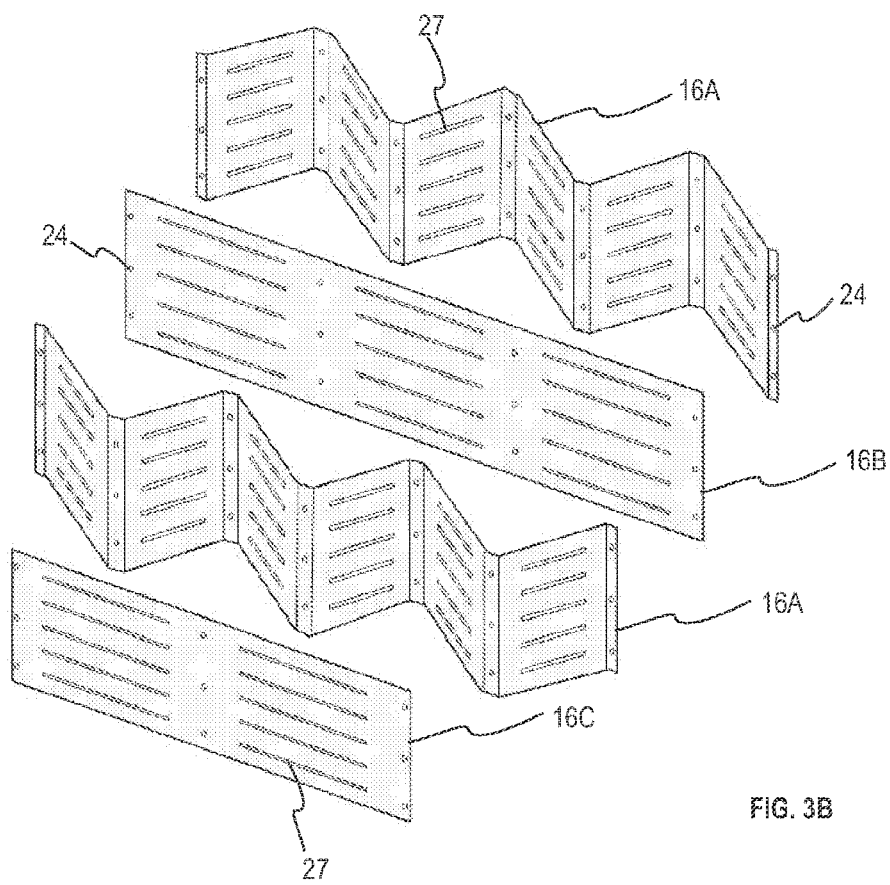
FIG. 3B is an isometric view of four wall components used in the construction of the embodiment of FIG. 3A

To more clearly show the components of the tank shown in FIG. 2B, reference is made to the exploded views of FIGS. 3A and 3B which highlight the presence of three types of wall: 16A, a zig-wag wall; 16B, a long planar wall; and 16C a short planar wall. The walls are fastened together by way of a fastener (such as a rivet) inserted through the holes 24.

The fluid flow control means in this embodiment takes the form of a series of horizontal slots (two of which are marked as 27). The slots are formed by punching the walls, which are made of a sheet metal in this embodiment. It will be noted that the slots are very narrow, and just of sufficient size so as to facilitate movement of liquid from cell to cell during filling of the tank, however are still capable of adequately restricting liquid flow so as to prevent the rapid shifting of the liquid load in response to a cornering force.

Figure 4:
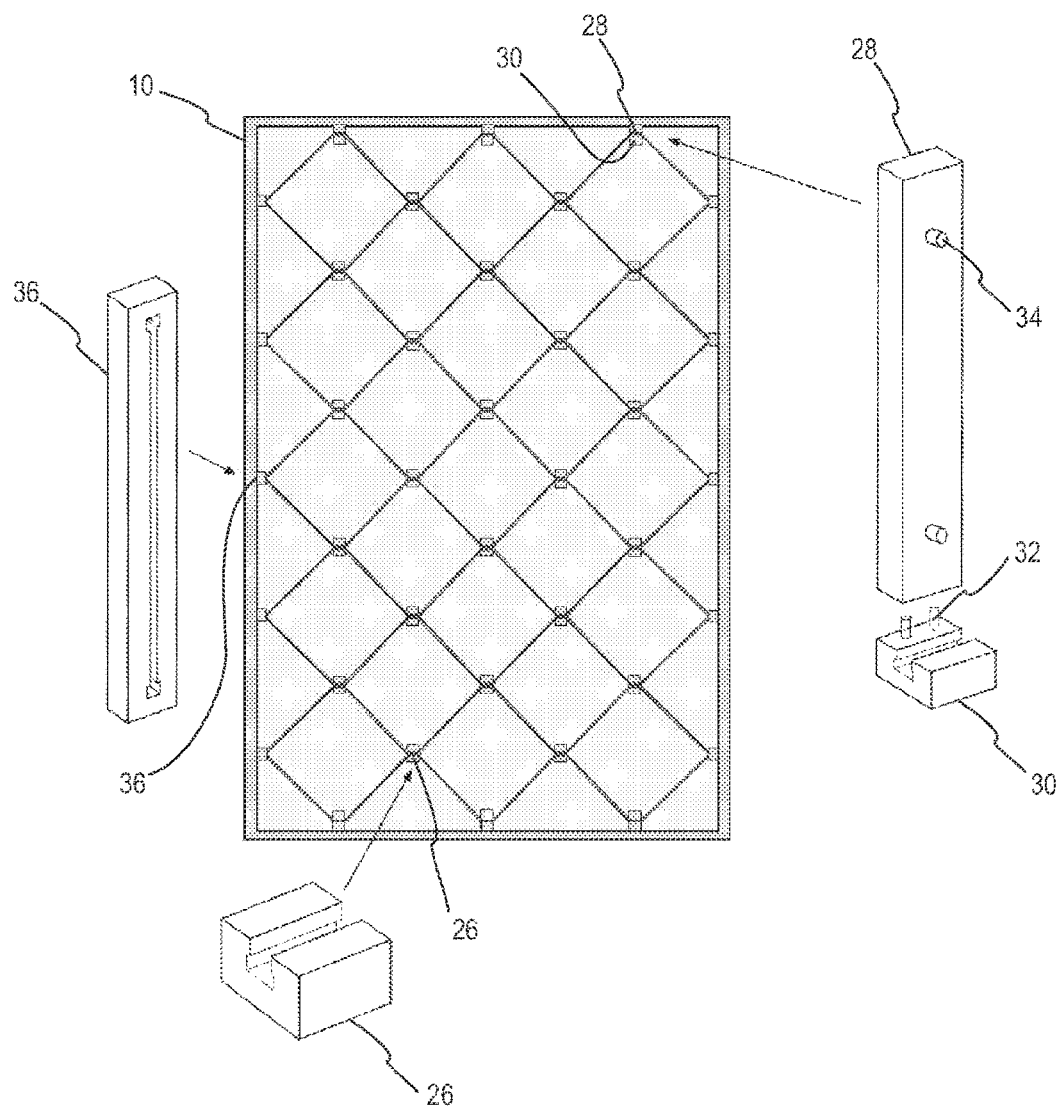
FIG. 4 is a plan view of a tank of the present invention, having a series of blocks disposed between the network of cells and the interior tank surfaces.

The embodiments of the previous figures have been shown devoid of any material disposed between the inner surfaces of the tank and the periphery of the network of cells. FIG. 4 shows a preferred embodiment whereby the lower edges of the cell walls are supported by a series of slotted base blocks (one of which is marked 26) to prevent any damage to the tank floor. Also shown in FIG. 4 is an end block disposed (one of which is marked 28) which is configured to engage with a modified base block 30 having upwardly extending members 32 adapted to engage with the end block 28. The end block has laterally and inwardly extending members 34 adapted to engage with the cell wall. Also provided are side blocks (one of which is marked as 36) having an elongate slot allowing for the insertion of a cell wall. All blocks 26, 28, and 36 are fabricated from a durable synthetic material (such as high density polyethylene) so as to protect the inner tank walls from rub damage in response to forces occasioned on the network of cells by the movement of liquid due to a cornering force. The interfaces between a cell and a block and/or a block and the interior tank wall may be devoid of any compound, or may be secured with a flexible compound such as a curable silicone or similar.

In some embodiments, the block may be considered sacrificial and require period inspection and replacement.

Figure 5A:
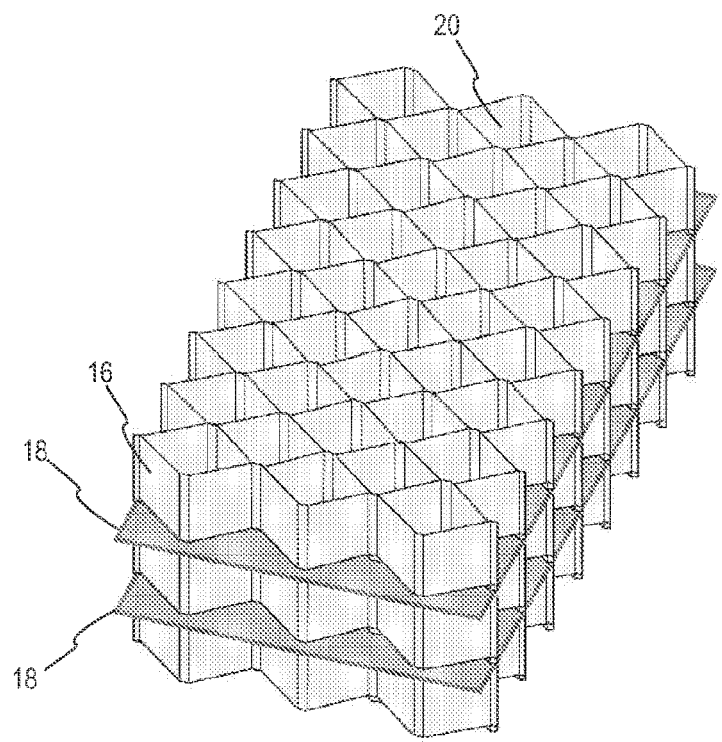
FIG. 5A is an isometric view of a three-layered form of the network of cells highlighting the position of the two horizontal dividers.
Figure 5B:
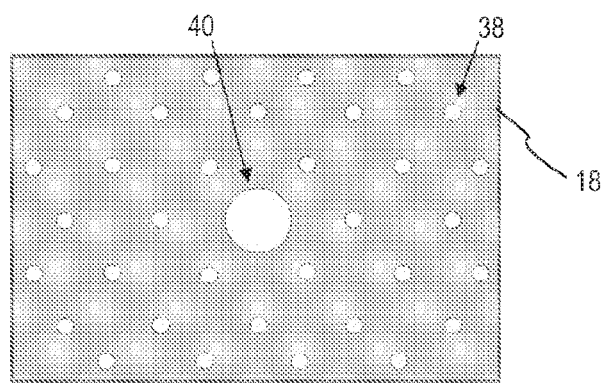
FIG. 5B is a plan view of one of the two (identical) horizontal dividers showing the large and small apertures.

FIG. 5A shows an embodiment having two horizontal dividers 18 so as to form three layers of cells. As shown in FIG. 5B the divider 18 comprises a series of small apertures 38 (one aperture per cell) and a larger central aperture 40. These apertures facilitate the flow of liquid from cell to cell during filling, while having a sufficiently small diameter so as to substantially inhibit the upward movement of liquid in the tank during cornering. The large aperture 40 allows for rapid entry of liquid during filling, the liquid quickly migrating down to the lower regions of the tank. The smaller apertures 38 allow the liquid to filter upwardly during filling. The large central aperture 40 is not a fluid flow control means within the context of the present invention because it provides little resistance to fluid movement from cell to cell. However, this large aperture is positioned centrally which is an area where upwardly moving liquid in not expected during cornering—rising liquid will only be expected toward the left or right peripheral regions of the tank (depending on whether the vehicle carrying the tank is cornering to the left or right).

Figure 6A:
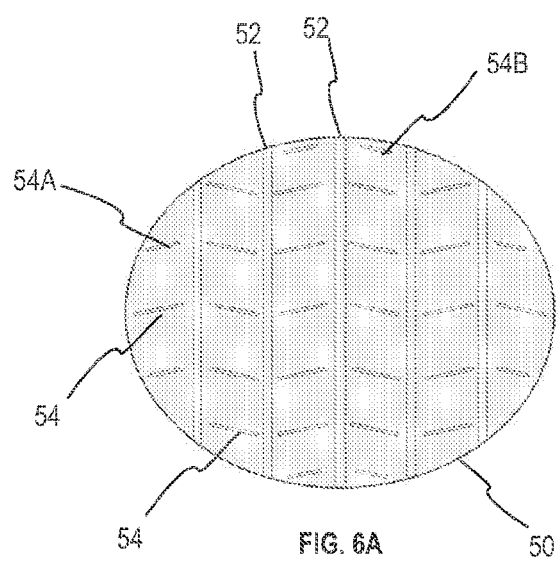
FIG. 6A is a face-on view is a circular wall used (in conjunction with further identical or similar circular walls) to form a network of cells within a cylindrical tank.
Figure 6C:
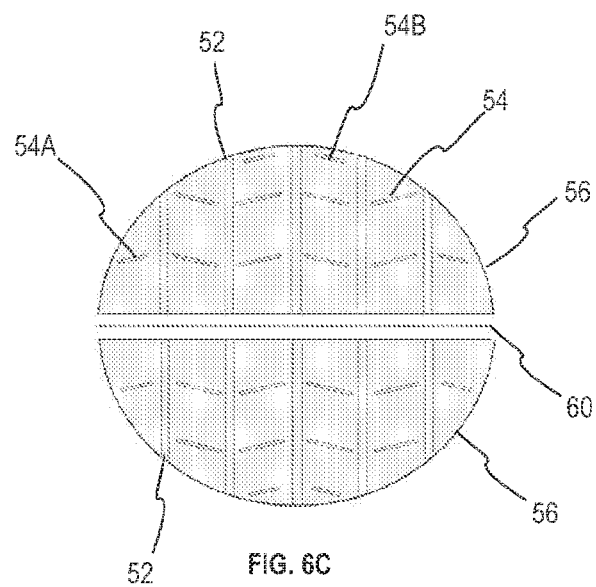
FIG. 6C is a face-on view is a semicircular circular wall used (in conjunction with further identical or similar circular walls) to form a network of cells within a cylindrical tank. A horizontal divider is disposed between two opposed semicircular walls.
Figure 6B:
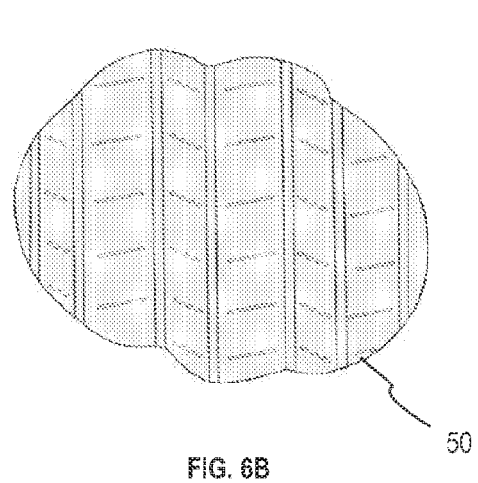
FIG. 6B is an isometric view of the circular wall of FIG. 6A.

Reference is now made to FIGS. 6A to 6D directed to application of the present invention to a cylindrical tank. Similar to the embodiments of rectangular tanks, the cylindrical embodiment of FIG. 6 comprises a series of circular walls, a first type 50 of which is shown in FIGS. 6A and 6B. In this embodiment, the vertical wall 50 is circular when viewed face-on (FIG. 6A) but as is apparent from isometric view FIG. 6B the wall 50 comprises a series of vertical bends (two only marked as 52) to provide a zig-zag formation (when considered in plan view). Extending through the wall 50 is a series of horizontal slots 54 which act to allow the controlled movement of a liquid therethrough. The slots (two only marked 54) act to retard the movement of liquid from one side of the wall 50 to the other. As will be noted, slots 54 in the central region of the wall are identically dimensioned to each other. However, slots at the periphery (for example, the slots marked 54A and 54B) are of smaller dimension so as to be accommodated within the edge of the circular wall 50. While it is not essential that the slots 54 are bordered on all sides, it is nevertheless preferred so as to provide a greater degree of control over liquid movement therethrough.

Figure 6D:
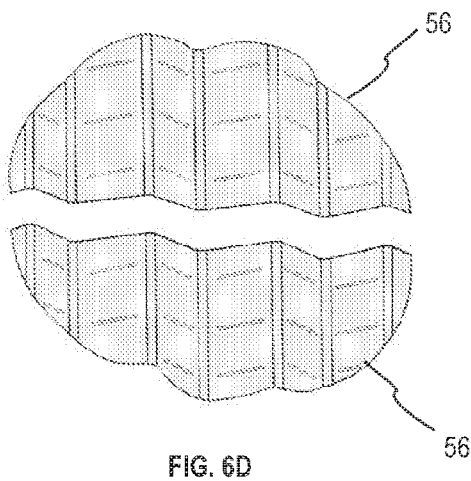
FIG. 6D is an isometric view of the circular wall of FIG. 6C.

A second-type of vertical wall is the semicircular wall 56 shown in FIGS. 6C and 6D. Apart from the semicircular geometry, this type of wall is substantially identical to that of FIGS. 6A and 6B in so far as it comprises horizontal slots 58 to retard the movement of liquid. These semicircular walls 56 are used in embodiments where a single horizontal divider 60 is used. The divider 60 is similar to that marked 18 in FIG. 5B in so far it comprises apertures (not shown) similar to those marked 38 and 40 in FIG. 5B. As for other embodiments described herein, the apertures allow for filling and draining the tank.

As will be appreciated, two or more horizontal dividers 60 may be included, as shown in FIG. 5A for versions of the invention applicable to rectangular prismatic tanks.

When two vertical walls 50 or 56 are abutted such that that vertical bends 52 of adjacent vertical walls 50 or 56 contact each other, a series of elongate cells are formed. The vertical wall 50 or 56 may be fixed together by fastening means (not shown).

The elongate cells formed by the abutment of vertical wall 50 or 56 may be divided by the horizontal divider 60 in some embodiments.

Figure 6E:
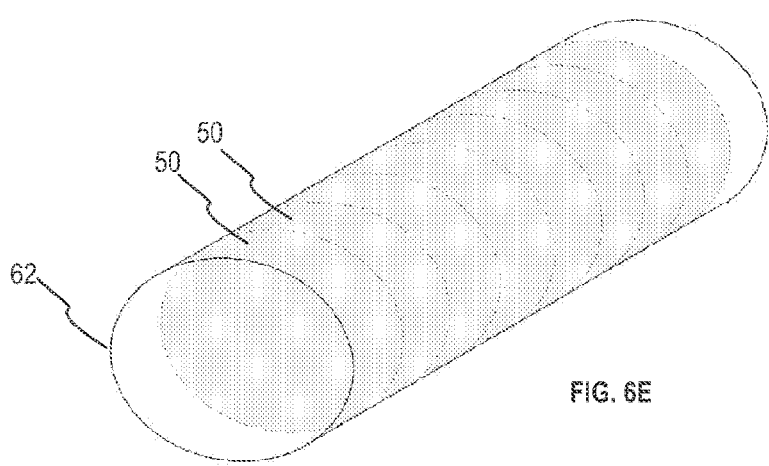
FIG. 6E is a highly diagrammatical representation of a series of circular walls (of the type shown in FIGS. 6A and 6B) as disposed within a cylindrical tank.

FIG. 6E shows highly diagrammatically the disposition of a series of circular vertical walls (only two of which are marked as 50) within a cylindrical tank 62. The circular vertical walls 50 are connected to form a network of cells (not shown) before the entire network of cells in inserted lengthwise into the cylindrical tank 62. Where the tank 62 has a hinged end door, the door is closed after the network of cells is inset. Otherwise, an end wall is welded in place and the network of cells becomes a permanent fixture within the tank.

In designing a tank according to the present invention, regard may be had to the following design parameters.

Tank Geometry

Figure 7:
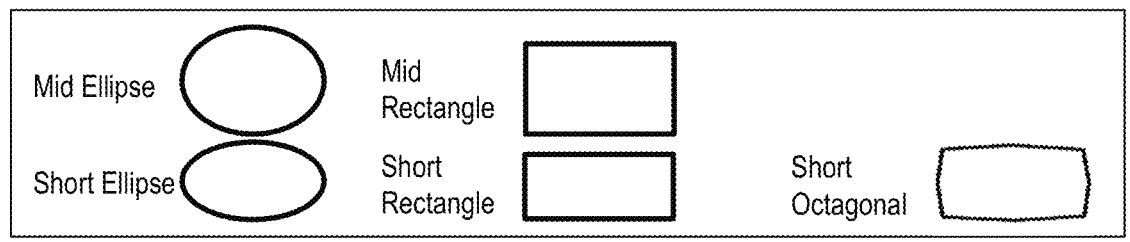
FIG. 7 is a diagram showing tank geometries used in COG calculations.

Centre of Gravity (COG) calculations confirm nominal lowering of the COG by switching from a cylindrical or elliptical tank to an equal volume and width rectangular tank is 21.5% for all tank heights. Further, a short octagonal shape with filleted corners and equal width and volume provides a 16.7% COG reduction over a short ellipse. Reference is made to FIG. 7 and Table 1 herein.

TABLE 1

|  | Mid Elipse | Short Elipse | Mid Rectangle | Short Rectangle | Short Octagonal |
| --- | --- | --- | --- | --- | --- |
| Width | 2.4 | 2.4 | 2.4 | 2.4 | 2.4 |
| Height | 2 | 1.5 | 1.71 | 1.29 | 1.25 |
| COG above base | 1 | 0.75 | 0.79 | 0.59 | 0.625 |
| % Reduction COG height |  |  | 21.5 | 21.5 | 167 |

Thus, in preferred embodiments of the invention tanks having a certain geometry may selected with the aim of lowering COG in the first instance whilst still considering strength. For example, the short octagonal shape with filleted corners is an inherently stronger shape than a rectangular tank and still provides a 16.7% reduction in the COG height compared with an elliptical tank.

Figure 11A:
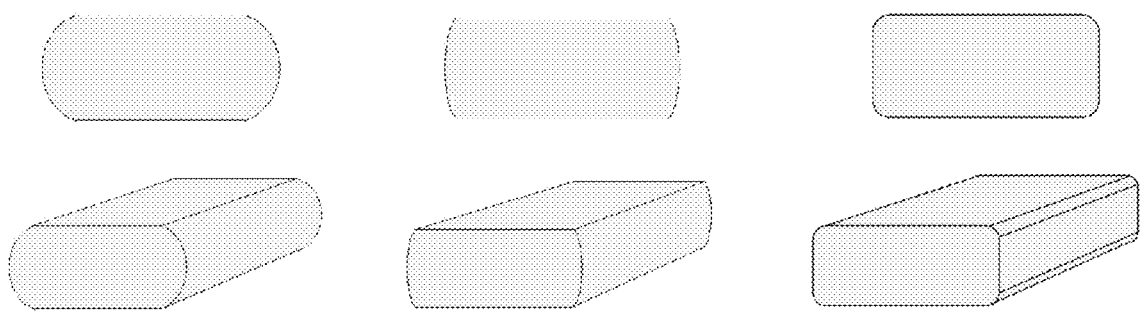
FIG. 11A shows diagrammatically a three basic shapes that may be used in designing a liquid tank of the present invention. The upper shape is a cross-section and the lower shape is an isometric view.
Figure 11B:
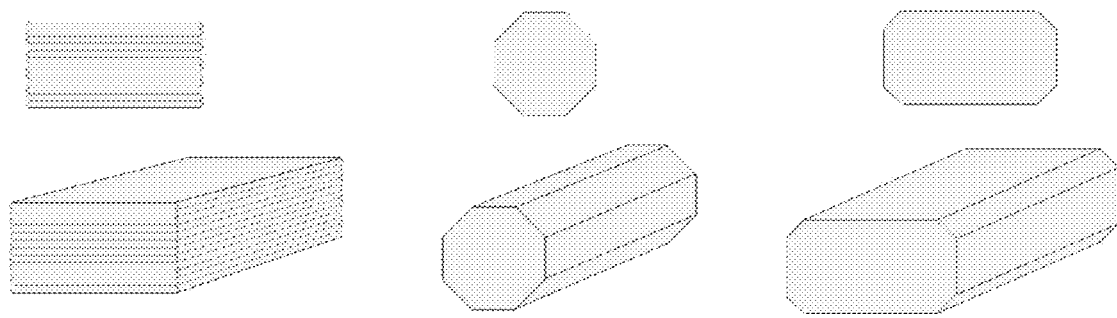
FIG. 11B shows diagrammatically a three basic shapes that may be used in designing a liquid tank of the present invention. The upper shape is a cross-section and the lower shape is an isometric view.
Figure 12A:
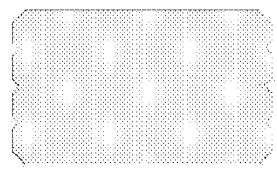
FIG. 12A is an end view of a version of the present liquid tank having sides wall corrugated for added strength. The end walls in this embodiment are also corrugated, though corrugations not being shown to improve clarity.
Figure 12B:
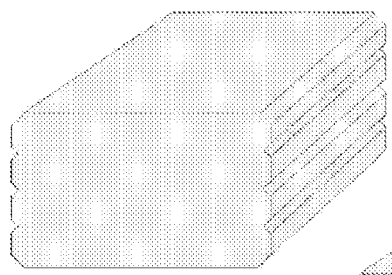
FIG. 12B is an isometric view of the liquid tank of FIG. 12A. The end walls in this embodiment are also corrugated, though corrugations not being shown to improve clarity.
Figure 12C:
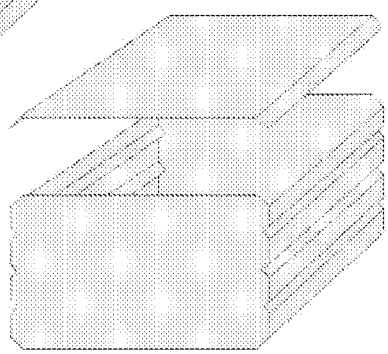
FIG. 12C shows diagrammatically an embodiment of the liquid tank of 12A having a removable roof panel so as to provide access to the interior, and the network of cells (not shown)
Figure 12D:
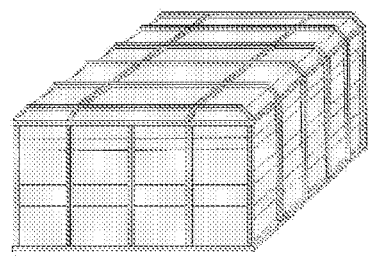
FIG. 12D shows diagrammatically and in isometric view an embodiment of the present liquid tank having corrugations on all four walls, and also ribbing running orthogonally to the corrugations to provide further strength.

Further reference is made to FIGS. 11A and 11B showing other potential tank geometries.

It will be understood that there is no requirement for any wall, floor or ceiling of the liquid tank to be planar. Indeed, in some embodiments corrugations may be introduced to confer greater strength on the tank overall, as shown in FIGS. 12A, 12B, 12C, and 12D. Further strengthening may be provided by the use of ribbing or other frame-like means to prevent buckling of a wall, floor or roof of the tank. A highly strengthened tank may be used where the tank is used to contain material under pressure. For example, a volatile liquid may form a vapour phase or a gas phase within a tank, thereby increasing pressure within the tank.

Centre of Gravity—Steady Cornering

As shown supra, specific cross sectional shapes can lower the COG. However, when cornering the movement of fluid within the tank can shift the COG to the outside of the turn and reduce the roll stability of the vehicle. The addition of vertical walls (extending longitudinally) not only stabilises the liquid, but the division into cells (by the inclusion of horizontal dividers) will improve the rollover stability by limiting the movement of the COG away from its stationary location.

Figures 8A, 8B:
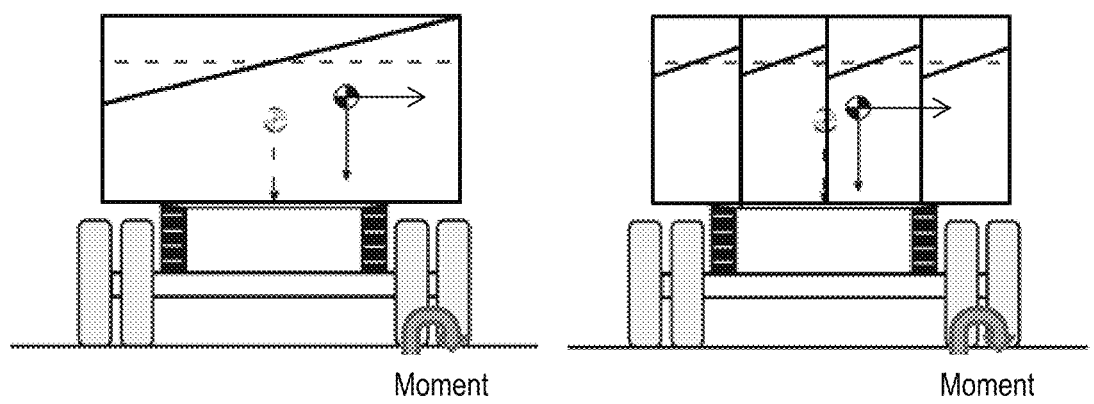
FIG. 8 is a diagram showing the differential effect of COG movement in a tank having longitudinal vertical walls compared with a tank having no such walls.

Movement of the COG when cornering is shown in FIG. 8A, for a tank with no vertical walls and 8B for a tank with 3 vertical walls.

To determine the cornering acceleration on the tank, standards regarding tilt test requirements were reviewed. Specifically, the National Transport Commission's "PBS Scheme—The Standards and Vehicle Assessment Rules" was considered. Section C11 "Static Rollover Threshold" requires a performance level of 0.35 g acceleration during a static tilt test. The downward acceleration is 1 g or 9.81 m/s$^2$.

It was calculated that 0.35 g acceleration equates to a stationary angle of tilt of 19.3 degrees. The calculations are based on this static angle for a tank with full height cells of 1.25 metres. The tank is filled to a level of 0.865 metres from the base, with water as the carried fluid. This value is the highest a tank with no vertical walls can be filled before the water surface touches the top of the tank under 0.35 g sideward acceleration. The tank volume at this level is 7231 Litres.

For the described 0.35 g turn, the COG of the liquid shifts 29 mm upward and 163 mm outward on the tank with no vertical walls. The 163 mm outward shift reduces the rollover moment arm by 15%, significantly increasing instability.

For a tank with 3 vertical walls as shown, the COG of the liquid only shifts 2 mm upward and 10 mm outward.

For a tank with 9 vertical walls, approximately 220 mm cell width, the COG of the liquid only shifts 0.3 mm upward and 1.6 mm outward.

The benefit to rollover stability is apparent and improves with additional vertical walls. However, closer consideration and cost analysis may determine an optimum number of vertical walls, with adequate safety improvement.

Tank Wall Thickness

The present invention is adaptable to any tank cross sectional shape. Consideration may be given to AS1210: 2010 to determine minimum required wall thicknesses for the road transport of non-dangerous goods.

Clause 3.26.2 of AS1210 states that "Vessels that are used for the transport of material under no pressure but which are subject to pressure on discharge of contents may be regarded as static vessels, except that the design and manufacture of supports and attachments to the pressure parts shall comply with the requirements for transportable vessels".

One embodiment of a possible tank design is predominantly a rectangular prism. For this shape, the requirements for static vessels set out in clause 3.31 (Vessels of non-circular cross-section) may be generally applicable. The clause essentially states that the vessel shall either be designed by the method described in AS1228 (Pressure Equipment—Boilers), Appendix 13 of ASME BPV-VIII-1 (American Society of Mechanical Engineers—Pressure Vessels), EN 13445 (British Standards Unfired Pressure Vessels), or by means set out in clause 3.1.3 of AS1210 as shown below:

a) Design by formulae and equations and related requirements given in the Standard b) Where a design method is not provided in this Standard, a design method in another internationally recognised standard may be used.

c) Design by analysis using rigorous mathematical stress analysis such as linear elasticity theory or Finite Element Analysis (FEA)

d) Design using experimental stress analysis, e.g. strain gauging, photoelasticity, etc. (see Clauses 5.12.1 to 5.12.6).

e) Design by fracture mechanics, according to either BS 7910 or API 579.

f) Design using destructive or proof type testing (see Clause 5.12.7).

g) Design based on successful experience of equivalent designs under equivalent conditions.

Using the method for "rectangular header" design presented in AS1228:2016 with tank dimensions as shown in FIG. 9A, the minimum wall thickness to carry a full tank of water, for the tank sides (including the lid and base) was 11.2 mm and for the end walls, 12.2 mm. This is assuming that the tank is made from ASTM A 204 Grade B steel at 50° C. (a mid-range strength steel from Appendix B AS1210:2010)

with the internal design pressure calculated as the head from the water (12.3 kPa). A worst case connection factor for the end plates was also used. The resulting tank mass would therefore be approximately 2800 kg.

This calculation assumes the tanker shape is a rectangular prism, as shown in FIG. 9A, with perfectly flat sides. The calculation is included herein to show the significant effect on required wall strength and stiffness when building tanks with this shape. The design may include curved edges and tapered sides. Such features would significantly reduce the required wall thickness, but would require more complex analysis, such as FEA, to design.

A static cylindrical pressure vessel, which could also incorporate the network of cells of the present invention, of the same cross section, length and material with spherical ends (FIG. 9B) would require a shell thickness of 1.0 mm and an end thickness of 0.9 mm, weighing approximately 245 kg. This is also assuming the worst weld efficiency factor in the thickness equation, and that the internal pressure due to the water head is 18.4 kPa due to the increased cross sectional diameter.

Although the calculated wall thicknesses required for a cuboid tank are higher than a typical cylindrical vessel for the fluid head design pressure, this is assuming that the sides, top and base are totally flat and unreinforced. Rather than using a pure cubic shape, reshaping the tank with curved edges and tapered sides, and possibly featuring ribbed, corrugated or structurally-reinforced plates would improve the tank's strength to weight ratio.

To design and evaluate such an arrangement it is suggested that Finite Element Analysis (FEA) be performed. Given the increased vessel complexity, FEA is the most feasible option of the design methods for non-circular cross-section vessels provided in clause 3.31 of AS1210:2010.

Using this method it is envisaged that the tank could be designed to a feasible strength to weight ratio for the transportation of fluids. Parameters for potentially useful tank designs are shown in Table 3, however it is noted that the wall thickness may be better determined through detailed FEA simulations.

Fatigue loading must also be considered under the FEA design requirements set out in the transportable vessel Section (3.26) of AS1210 and Appendix M of the standard defines the methodology.

TABLE 2

| Tank Configuration | Design Pressure | Maximum Shell Thickness | End Thickness | Tank Mass |
|---|---|---|---|---|
| 3800 × 2200 × 1250 Rectangular Prism | Fluid head (12.3 kPa) | 11.2 mm | 12.2 mm | 2800 kg |
| 3800 × 2200 × 1250 Filleted Octagonal Prism | Fluid head (12.3 kPa) | To be determined by FE analysis | | |
| 3800 × 1871 Sphere-Ended Cylinder | Fluid head (18.4 kPa) | 1.0 mm | 0.9 mm | 245 kg |

Cell Design and Loads

The cell size that is most efficient from a cost/safety point of view may be determined having reference to economic limitations, with acceptable safety performance.

Calculations were conducted to determine the turning loads on a square vertical wall section, to provide a starting point for calculating the material requirements of the overall cellular network. Without wishing to be limited by theory, it is expected that the overall load on the cell network will be the same regardless of the cell shape. For these calculations, the length of the tank was set at 3.8 metres and the width 2.2 metres. With a 1.25 metre height, this giving the tank a 10,450 L capacity.

To determine the load on the baffle structure, the same 0.35 g turning acceleration from the PBS Scheme was used. The calculations do not consider the effect of the apertures through the vertical walls, and so only calculate the turning load without fluid moving through the cell network structure. The tank is filled to a level of 1.058 metres from the base, with water as the fluid. This value is the highest a tank having a single longitudinal vertical wall can be filled before the water surface touches the top of the tank under 0.35 g sideward acceleration. Cells are assumed to be the full height of the tank in this analysis. This is considered a worst case scenario prior to dynamic load assessment with CFD.

The calculation method assumes the vertical wall structure is not rigidly attached to the tank, but would only push on the outside tank wall. It determines the pressure difference on each side of a longitudinal baffle, and sums the resulting forces across the complete baffle grid through the transverse baffles, as depicted in FIG. 10. The resulting force shown in Table 3 acts on the outside edges of the baffle structure.

TABLE 3

| Number of Baffles in 2.2 m width | Cell Width | Head Height | Head Pressure | Number of Cells in 3.8 m Length | Side Force per Cell | Total Side Force on Baffles | Notes |
|---|---|---|---|---|---|---|---|
| n | m | m | Pa | N | kg | kg | |
| 0 | 2.20 | 0.19+ | 3,777+ | 1.7 | — | — | +No longitudinal baffles + Side force per cell = (n − 1) × Area × Head |
| 1 | 1.10 | 0.19 | 3,777 | 3.5 | 488* | 1 547 | |
| 2 | 0.733 | 0.128 | 2,518 | 5.2 | 398 | 2,063 | |
| 3 | 0.55 | 0.096 | 1,888 | 6.9 | 336 | 2,321 | |
| 4 | 0.44 | 0.077 | 1,511 | 8.6 | 287 | 2,475 | |
| 5 | 0.36 | 0.064 | 1,259 | 10.4 | 249 | 2,579 | |
| 6 | 0.31 | 0.055 | 1,079 | 12.1 | 219 | 2,652 | |
| 7 | 0.27 | 0.048 | 944 | 13.8 | 196 | 2,707 | |
| 8 | 0.24 | 0.043 | 839 | 15.5 | 177 | 2,750 | |
| 9 | 0.22 | 0.039 | 755 | 17.3 | 161 | 2,785 | |

Table 2 summarises the results of the wall thickness calculations performed for cylindrical and rectangular vessels.

FIG. 10 is a diagram of the system with 3 longitudinal vertical walls, as an example. The angle lines represent the water level when the tanker negotiates a corner. The shorts arrows extending into the second compartment (from left) show an approximation of the resultant pressure distribution each cell wall would experience.

The resultant side force per cell (the longer arrows in FIG. 10) was calculated for longitudinal vertical wall divisions from 0 (no walls) to 9 (forming 10 cells across the tank).

Reference is made to Table 3 which shows the resultant forces on square cell walls from 0.35 g constant cornering. As will be noted, side force per wall decreases with an increasing number of walls in the structure. However, the total side force experienced by the wall structure increases as the force taken by the tank wall decreases.

Normalising the force on the baffle structure to a per-metre value may be a more valid measure than "per cell" values and results in a range of 400 kg/m to 730 kg/m for the above table values. This is calculated by dividing the total side force on the baffles by the 3.8 metre tank length. A braking load can also be calculated by scaling up the loads in Table 4. Theoretically a longitudinal load up to approximately 0.7 g is possible under maximum braking (most tires have a coefficient of friction of up to 0.7 on dry bitumen). Further, the load on the wall will increase proportionally by acting over the longer length of the tank, rather than the width. For a 3.8 metre long tank, the longitudinal baffle loads would need to be increased by 1.7 (3.8 m length/2.2 m width). Therefore the values calculated in this section may be tripled (conservatively) to estimate the longitudinal loads.

Table 3 provides load values which can be used in FEA simulations to perform detailed design of the network structure. Determining the baffle thickness is only possible once the attachment method is decided and the distribution of load across the baffle edges is known.

While the present invention has been described mainly by reference to road tankers, it will be understood that applications to other scenarios are intended. The network of cells may be used in relation to virtually any type of liquid transport tanks including ISO shipping tanks, railway rolling stock tanks, ocean bulk oil tanker ships, and firefighting aircraft.

It should be appreciated that in the above description of exemplary embodiments of the invention, various features of the invention are sometimes grouped together in a single embodiment, figure, or description thereof, for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A liquid transport apparatus comprising:
a tank having a central axis and opposed lateral walls, and paired wheels on either side of the central axis,
wherein the tanks comprise an internal network of cells, the cells configured such that in use, movement of liquid in a direction generally orthogonal to the central axis of the tank and between adjacent cells of the network of cells is retarded such that under conditions of liquid movement within the tank, kinetic energy transferred from the liquid to one of the opposed lateral walls of the tank is reduced as compared with the case where no cells are present,
wherein the network of cells is formed from three or more layers of cells, the three or more layers of cells formed by two or more dividers, and
wherein the each cell of the network of cells has vertical walls being formed from first and second elongate members being sheet-like and having apertures formed therein configured to retard movement of liquid, the first and second elongate members making mutual contact at intervals along their lengths, and floors and ceilings of the cells being formed by the two or more dividers, and each of the two or more dividers is a sheet-like structure having a plurality small apertures formed therein configured to inhibit the upward movement of liquid during liquid tank cornering, the plurality of apertures together forming a minority of the divider area.

2. The liquid tank of claim 1, having a lateral wall against which a liquid within the tank bears under a cornering force exerted on the tank, the cornering force having a vector directed toward the lateral wall, and in which case the cells are formed by one or more walls configured to prevent or inhibit movement of the liquid toward the lateral wall.

3. The liquid tank of claim 1, wherein the liquid tank is elongate, and the cells are formed by one or more walls extending substantially the length of the tank, the one or more walls being substantially parallel to the longitudinal axis of the tank.

4. The liquid tank of claim 1, wherein the liquid tank is elongate, and the cells are formed by at least about 2, 3, 4, 5, 6, 7, 8, 9, 10, 11, or 12 walls extending substantially the length of the tank, the at least about 2, 3, 4, 5, 6, 7, 8, 9, 10, 11, or 12 walls being substantially parallel to the longitudinal axis of the tank.

5. The liquid tank of claim 1, wherein the internal network of cells comprises a first cell and a second cell, which share a common wall, and the common wall comprises liquid flow control means configured such that under conditions of liquid movement the flow of liquid between the cells is substantially retarded.

6. The liquid tank of claim 1, wherein the internal network of cells comprises and walls of the first cell and the second cell abut, and the abutting walls comprise liquid flow control means configured such that under conditions of liquid movement the flow of liquid between the cells is substantially retarded.

7. The liquid tank of claim 5, wherein the liquid flow control means is configured such that under conditions of tank filling and/or tank emptying liquid flows substantially uninhibited between the first and second cells.

8. The liquid tank of claim 5, wherein the liquid flow control means is or comprises one or more apertures.

9. The liquid tank of claim 1, wherein the majority of cells of the network of cells share a wall with another cell, or have a wall abutting another cell.

10. The liquid tank of claim 1, wherein the network of cells is formed from four or more layers of cells, the four or more layers of cells formed by three or more horizontal dividers.

11. The liquid tank of claim 1, wherein walls of the cells of the network of cells are substantially planar.

12. The liquid tank of claim 1, wherein each cell of the network of cells is substantially immovable with respect to the remaining cells.

13. The liquid tank of claim 1, wherein the network of cells is configured so as to be substantially rigid.

14. The liquid tank of claim 1, wherein the network of cells is configured so as to be removable from the tank as a unitary item from the tank.

15. The liquid tank of claim 1, wherein the tank is openable so as to allow removal of the network of cells.

16. The liquid tank of claim 1, wherein the tank is openable from a top of the tank.

17. The liquid tank of claim 1, wherein a resiliently deformable material is disposed between an edge of network of cells and the tank wall.

18. The liquid tank of claim 1, which is substantially rectangular prismatic, or has a cross-sectional profile which is circular or ovoid.

19. The liquid tank of claim 1, configured so as to be fixed to, or hauled by, a vehicle.

20. A liquid transport apparatus comprising:
a tank having a central axis and opposed lateral walls, and paired wheels on either side of the central axis,
wherein the tank comprises an internal network of cells, the cells configured such that in use, movement of liquid in a direction generally orthogonal to the central axis of the tank and between adjacent cells of the network of cells is retarded such that under conditions of liquid movement within the tank, kinetic energy transferred from the liquid to one of the opposed lateral walls of the tank is reduced as compared with the case where no cells are present,
wherein the network of cells is formed from three or more layers of cells, the three or more layers of cells formed by two or more dividers, and wherein the two or more dividers each comprise (i) a plurality of relatively small apertures configured to inhibit the upward movement of liquid during liquid tank cornering, and (ii) one or more relatively large apertures configured to allow relatively uninhibited movement of liquid therethough.

21. The liquid transport apparatus of claim 20, wherein the one or more relatively large apertures are positioned toward a central region of the tank and away from the side walls of the tank.

* * * * *

UNITED STATES PATENT AND TRADEMARK OFFICE
CERTIFICATE OF CORRECTION

| | | |
|---|---|---|
| PATENT NO. | : 11,235,695 B2 | Page 1 of 1 |
| APPLICATION NO. | : 16/301816 | |
| DATED | : February 1, 2022 | |
| INVENTOR(S) | : Bradley John Carpenter | |

It is certified that error appears in the above-identified patent and that said Letters Patent is hereby corrected as shown below:

On the Title Page

Item (72) Please delete "Bradely John Carpenter" and insert therefor --Bradley John Carpenter--.

Signed and Sealed this
Twenty-fourth Day of May, 2022

Katherine Kelly Vidal
*Director of the United States Patent and Trademark Office*